United States Patent [19]
Kuramoto

[11] Patent Number: 5,340,892
[45] Date of Patent: Aug. 23, 1994

[54] PROCESS FOR PRODUCING STYRENE POLYMERS

[75] Inventor: Masahiko Kuramoto, Ichihara, Japan

[73] Assignee: Idemitsu Kosan Co., Ltd., Tokyo, Japan

[21] Appl. No.: 38,089

[22] Filed: Mar. 29, 1993

Related U.S. Application Data

[63] Continuation of Ser. No. 727,657, Jul. 9, 1991, abandoned, which is a continuation-in-part of Ser. No. 585,724, Sep. 20, 1990, abandoned.

[30] Foreign Application Priority Data

Sep. 29, 1989 [JP] Japan .................. 1-256371

[51] Int. Cl.$^5$ .............. C08F 4/64; C08F 12/08
[52] U.S. Cl. .................. 526/119; 526/160; 526/165; 526/346; 526/347.2
[58] Field of Search .......... 526/119, 160, 165

[56] References Cited

U.S. PATENT DOCUMENTS 4,680,353 7/1987 Ishihara et al. ............ 526/160
4,935,474 6/1990 Ewen et al. ............ 526/114

FOREIGN PATENT DOCUMENTS 0224097 6/1987 European Pat. Off. .
0276801 8/1988 European Pat. Off. .

*Primary Examiner*—Fred Teskin
*Attorney, Agent, or Firm*—Oblon, Spivak, McClelland, Maier & Neustadt

[57] ABSTRACT

Disclosed is a process for producing a styrene polymer having a syndiotactic configuration and a wide molecular weight distribution, which is characterized by using as catalyst (a) two or more kinds of titanium compounds and (b) alkylaluminoxane, in the polymerization of styrene monomers.

According to the process of the present invention, a styrene polymer which is excellent in physical properties such as heat resistance because of a high syndiotacticity, and also has a wide molecular weight distribution can be obtained. These styrene polymers can be suitably used as materials for various moldings including hollow molding, sheet molding, and film molding.

10 Claims, No Drawings

PROCESS FOR PRODUCING STYRENE POLYMERS

This application is a continuation of application Ser. No. 07/727,657, filed on Jul. 9, 1991, now abandoned which is a continuation-in-part of Ser. No. 07/585,724, filed Sep. 20, 1990, now abandoned.

BACKGROUND OF THE INVENTION

1. Field of the Invention

The present invention relates to a process for producing styrene polymers, more particulary to a process for producing styrene polymers having a high degree of syndiotactic configuration with a wide molecular weight distribution, by a polymerization reaction using specified catalysts in a comparatively simple step.

2. Description of the Related Arts

Styrene polymers have heretofore been widely used as materials of various moldings. Especially, styrene polymers having a syndiotactic configuration are excellent in physical properties such as heat resistance and water resistance, so utilizations of said polymers have attracted attention.

As the process for producing such styrene polymers having a syndiotactic configuration, a process for polymerizing with the use of catalysts containing titanium compound and alkylaluminoxane as main components (Patent Application Laid-Open No. 187708/1987) has been found. However, though the styrene polymer having a syndiotactic configuration produced according to said process have a high syndiotacticity, its molecular weight distribution was narrow such as weight average molecular weight (Mw)/number average molecular weight (Mn)=1.5 to 3.0. As for styrene polymers having a narrow molecular weight distribution thus obtained, there has been no problem in injection molding, but there have been problems such as draw down or a large neck-in, in hollow molding, and sheet and film molding.

The present inventors have studied earnestly to produce styrene polymers which are suitable for hollow molding, sheet and film molding, and have a wide molecular weight distribution and a high syndiotacticity. As the result, it has been found that the object can be attained by polymerization reaction with the use of catalysts containing not less than two kinds of titanium compounds and alkylaluminoxane. The present invention has been accomplished according to these knowledges.

SUMMARY OF THE INVENTION

The present invention is to provide a process for producing styrene polymers having a high degree of syndiotactic configuration with a wide molecular weight distribution, which process comprises using a catalyst of (a) not less than two kinds of titanium compounds and (b) alkylaluminoxane, in a process for producing styrene polymers by polymerizing styrene monomer.

PREFERRED EMBODIMENTS OF THE INVENTION

The styrene monomers to be used as materials of the present invention are not critical and various ones can be used depending on the properties and applications required for polymers to be produced. Specifically, styrene; alkylstyrenes such as p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene; p-tert-butylstyrene, and p-phenylstyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, and o-methyl-p-fluorostyrene; alkoxystyrenes such as p-methoxystyrene, m-methoxystyrene, o-methoxystyrene, p-ethoxystyrene, m-ethoxystyrene, and o-ethoxystyrene; carboxymethylstyrenes such as p-carboxymethylstyrene, m-carboxymethylstyrene, and o-carboxymethylstyrene; alkyletherstyrenes such as p-vinylbenzylpropylether; polycyclic vinyl compounds such as vinylnaphthalene, vinylantracene, vinylbiphenyl can be mentioned.

They may be used singly or in the state of forming a copolymer using two or more kinds. In addition, in producing styrene copolymers, if necessary, with the above styrene monomers, olefin monomers such as ethylene, propylene, 1-butene, 1-hexene, 1-octene; diene monomers such as butadiene, isoprene; cyclic diene monomers; polar vinyl monomers such as methyl methacrylate, maleic anhydride and acrylonitrile can be used.

In the process of the present invention, (a) not less than two kinds of titanium compounds and (b) alkylaluminoxane can be used as catalyst.

Therein as (a) not less than two kinds of titanium compounds (hereinafter referred to as component (a)), two or more kinds of various compounds containing titanium may be selected and used appropriately without out specified limitation.

For example, at least two compounds selected from the group consisting of titanium compounds and titanium chelate compounds represented by the general formula:

(I)

or

(II)

(wherein $R^1$, $R^2$, $R^3$ and $R^4$ are each a hydrogen atom, an alkyl group having 1 to 20 carbon atoms, an alkoxyl group having 1 to 20 carbon atoms, an aryl group having 6 to 20 carbon atoms, an alkylaryl group and arylalkyl group, an acyloxy group having 1 to 20 carbon atoms, a cyclopentadienyl group, a substituted cycropentadienyl group, an indenyl group or a halogen atom; a, b and c are each an integer of 0 to 4; and d and e are each an integer of 0 to 3) may be used in combination.

$R^1$, $R^2$, $R^3$ and $R^4$ in the general formula (I) or (II) are each a hydrogen atom, alkyl group having 1 to 20 carbon atoms (specifically, a methyl group, an ethyl group, a propyl group, a butyl group, an amyl group, an isoamyl group, an isobutyl group, an octyl group, 2-ethylhexyl group and the like), an alkoxyl group having 1 to 20 carbon atoms (specifically, a methoxyl group, an ethoxyl group, a propoxyl group, a butoxyl group, an amyloxy group, a hexyloxy group, a phenoxyl group, 2-ethylhexyloxy group and the like), an aryl group having to 20 carbon atoms, an alkylaryl group and an arylalkyl group, group (specifically, a phenyl group, a tolyl group, a xylyl group, a benzyl group and the like), an acyloxy group having 1 to 20 carbon atoms (specifically, a heptadecylcarbonyloxy group and the like), a cyclopentadienyl group, a substituted cyclopentadienyl group (specifically, a methylcyclopentadienyl group, 1,2-dimethylcyclopentadienyl group, pentamethylcyclopentadienyl group and the like), an indenyl group or a halogen atom (chlorine, bromine, iodine and fluorine). There $R^1$, $R^2$, $R^3$ and $R^4$ may be identical or different.

More preferred titanium compounds include titanium compound represented by the general formula:

$$\text{TiRXYZ} \qquad (III)$$

wherein, R represents a cyclopentadienyl group, a substituted cyclopentadienyl group or an indenyl group, X, Y and Z independently represent a hydrogen, an alkyl group having 1 to 12 carbon atoms, an alkoxyl group having 1 to 12 carbon atoms, an aryl group having 6 to 20 carbon atoms, an aryloxy group having 6 to 20 carbon atoms, an arylalkyl group having 6 to 20 carbon atoms or a halogen. Of not less than two kinds of titanium compounds to be used, at least one kind selected from the above is preferably used. Further, not less than two kinds are preferably selected from these compounds.

The substituted cyclopentadienyl group represented by R in the above formula is, for example, a cyclopentadienyl group substituted by at least one of an alkyl group having 1 to 6 carbon atoms, more specifically, methylcyclopentadienyl group, 1,2-dimethylcyclopentadienyl group, 1,3-dimethylcyclopentadienyl group, 1,2,4-trimethylcyclopentadienyl group, pentamethylcyclopentadienyl group, and the like.

In addition, X, Y and Z independently represent a hydrogen, an alkyl group having 1 to 12 carbon atoms (specifically, a methyl group, an ethyl group, a propyl group, n-butyl group, an isobutyl group, an amyl group, an isoamyl group, an octyl group, 2-ethylhexyl group and the like), an alkoxyl group having 1 to 12 carbon atoms (specifically, a methoxyl group, an ethoxyl group, a propoxyl group, a butoxyl group, an amyloxy group, hexyloxy group, an octyloxy group, 2-ethylhexyloxy group and the like), an aryl group having 6 to 20 carbon atoms (specifically, a phenyl group, naphthyl group and the like), an aryloxy group having 6 to 20 carbon atoms (specifically, a phenoxyl group and the like), an arylalkyl group having 6 to 20 carbon atoms (specifically, a benzyl group) or a halogen (specifically, chlorine, bromine, iodine or fluorine).

Specific examples of titanium compounds represented by the general formula (III) include cyclopentadienyltrimethyltitanium,
cyclopentadienyltriethyltitanium,
cyclopentadienyltripropyltitanium,
cyclopentadienyltributyltitanium,
methylcyclopentadienyltrimethyltitanium,
1,2-dimethylcyclopentadienyltrimethyltitanium,
1,2,4-trimethylcyclopentadienyltrimethyltitanium,
pentamethylcyclopentadienyltrimethyltitanium,
pentamethylcyclopentadienyltriethyltitanium,
pentamethylcyclopentadienyltripropyltitanium,
pentamethylcyclopentadienyltributyltitanium,
cyclopentadienylmethyltitanium dichloride,
cyclopentadienylethyltitanium dichloride,
pentamethylcyclopentadienylmethyltitanium dichloride,
pentamethylcyclopentadienylethyltitanium dichloride,
cyclopentadienyldimethyltitanium monochloride,
cyclopentadienyldiethyltitanium monochloride,
cyclopentadienyltitanium trimethoxide,
cyclopentadienyltitanium triethoxide,
cyclopentadienyltitanium tripropoxide,
cyclopentadienyltitanium triphenoxide,
1,3-dimethylcylclopentadienyltitanium trimethoxide,
1,3,4-trimethylcylclopentadienyltitanium trimethoxide,
pentamethylcyclopentadienyltitanium trimethoxide,
pentamethylcyclopentadienyltitanium triethoxide,
pentamethylcyclopentadienyltitanium tripropoxide,
pentamethylcyclopentadienyltitanium tributoxide,
pentamethylcyclopentadienyltitanium triphenoxide,
cyclopentadienyltitanium trichloride,
pentamethylcyclopentadienyltitanium trichloride,
cyclopentadienylmethoxytitanium dichloride,
cyclopentadienyldimethoxytitanium chloride,
pentamethylcyclopentadienylmethoxytitanium dichloride,
cyclopentadienyltribenzyltitanium,
pentamethylcyclopentadienylmethyldiethoxytitanium,
indenyltitanium trichloride, indenyltitanium trimethoxide,
indenyltitanium triethoxide, indenyltrimethyltitanium,
indenyltribenzyltitanium, and the like.

Of these titanium compounds, a compound containing no halogen atoms is preferred and a titanium compound having at least one unsaturated $\pi$ electron type ligand is particularly preferred.

As component (a) of the catalyst of the present invention, not less than two kinds of titanium compounds as described above are used in combination.

In combining not less than two kinds, titanium compounds suitable for producing high-molecular weight polymers, and titanium compounds suitable for producing low-molecular weight polymers are preferably used in combination.

Various combination may be applied, for example, titanium compounds suitable for producing high-molecular weight polymers include a cyclopentadienyl group, in which R in the general formula (III) is substituted by 5 alkyl groups having 1 to 6 carbon atoms, specifically pentalkylcyclopentadienyl group such as pentamethylcyclopentadienyl. On the other hand, titanium compounds suitable for producing low-molecular weight polymers include cyclopentadienyl group in which R in the general formula (III) is unsubstituted cyclopentadienyl group or cyclopentadienyl group substituted by 1 to 4 alkyl groups having 1 to 6 carbon atoms.

Further, the compound represented by the general formula (III), and the compound represented by the general formula (I) excepting the compound represented by the general formula (III) can be used together.

The most preferred combinations of titanium compounds to obtain wide molecular weight distributions (e.g. whereby a weight average molecular weight/number average molecular weight (Mw/Mn) ratio of 4 to 50 can be obtained) are combinations of (i) TiRXYZ and TiR'X'Y'Z' or (ii) TiRXYZ and TiX'$_4$ where R represents a cyclopentadienyl group, a substituted cyclopentadienyl group having 1 to 4 substituents or an indenyl group; R' represents a substituted cyclopentadienyl group having 5 substituents; X, Y, Z, X', Y'; and Z' independently represent hydrogen, an alkyl group having 1 to 12 carbon atoms, an alkoxyl group having 1 to 12 carbon atoms, an aryl group having 6 to 20 carbon atoms, an aryloxy group having 6 to 20 carbon atoms, an arylalkyl group having 6 to 20 carbon atoms or a halogen.

The substituents on the cyclopentadienyl group are preferably alkyl groups having 1 to 6 carbon atoms.

The TiRXYZ compound is suitable for producing low-molecular weight polymers. Both R'TiX'Y'Z' and TiX'$_4$ are compounds suitable for producing high-molecular weight polymers.

Combinations of titanium compounds useful for practicing the invention include pentamethylcyclopentadienyltitanium trimethoxide and cyclopentadienyltitanium trimethoxide; pentamethylcyclopentadienyltitanium trimethoxide and cyclopentadienyltitanium triisopropoxide; Pentamethylcyclopentadienyltitanium triisopropoxide and cyclopentadienyltitanium trimethoxide; pentamethylcyclopentadienyltitanium triphenoxide and cyclopentadienyltitanium triphenoxide; pentamethylcyclopentadienyltitanium trimethoxide and 1,3-dimethylcyclopentadienyltitanium trimethoxide; pentamethylcyclopentadienyltitanium trimethoxide and 1,3,4-trimethylcyclopentadienyltitanium trimethoxide; pentamethylcyclopentadienyltitanium trichloride and cyclopentadienyltitanium trichloride; or pentamethylcyclopentadienyltrimethyltitanium and cyclopentadienyltrimethyltitanium can be mentioned.

Also, combinations of cyclopentadienyltitanium trichloride and tetraethoxytitanium; pentamethylcyclopentadienyltitanium trichloride and tetraethoxytitanium; pentamethylcyclopentadienyltitanium trimethoxide and tetraethoxytitanium; cyclopentadienyltitanium trichloride and tetrabenzyltitanium; or cyclopentadienyltitanium triethoxide and tetraethoxytitanium can be mentioned.

By varying these combinations, molecular weight or molecular weight distribution of the resulting styrene polymers can be controlled in the desired range.

As described above, in the present invention, combinations of the titanium compounds are various and not critical. However, those which react with each other to form a kind of titanium compound when mixed with other titanium compounds are not preferable generally, though they can be used as catalysts for polymerization by controlling the condition so that such reaction is not completed.

In addition, the proportion of not less than two kinds of titanium compounds is not critical and may be determined depending on the desired molecular Weight and molecular weight distribution.

As catalyst of the present invention, (b) alkylaluminoxane (hereinafter referred to as component (b)) is used with component (a). There, alkylaluminoxane is a condensation product (contact product) of condensing agent (for example, water) and various alkylaluminum compounds.

As alkylaluminum compounds used to obtain alkylaluminoxane, the compound represented by the general formula:

$$AlR^5_3 \qquad (IV)$$

(wherein, $R^5$ is an alkyl group having 1 to 8 carbon atoms), specifically, trimethylaluminum, triethylaluminum, triisobutylaluminum and the like can be mentioned, and trimethylaluminum is most preferable.

A typical example of the condensing agent to be reacted with the above alkylaluminum compound is water. In addition, any compounds can be used as long as they undergo a condensation reaction with alkylaluminum compounds.

As alkylaluminoxane as component (b), chain alkylaluminoxane represented by the following general formula:

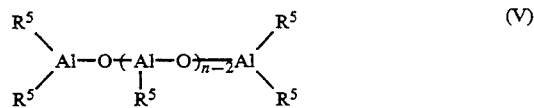

(V)

(wherein n represents an integer of 2 to 50 and $R^5$ is defined as above) or cyclic alkylaluminoxane (degree of polymerization 2 to 52) having a recurring unit represented by the following general formula:

(V')

In general, the contact product of the alkylaluminum compound (e.g., trialkylaluminum) and water contains aforementioned chain alkylaluminoxane and cyclic alkylaluminoxane, unreacted alkylaluminum compound (e.g., trialkylaluminum), various mixtures of condensates and further a molecule resulting from association in a complicated manner of the above mixture, the type of which varies depending on contacting conditions of alkylaluminum compound are water.

Suitable examples of the above alkylaluminoxane are those in which the area of the high magnetic field component in the methyl proton signal region due to the aluminum-methyl group (Al—CH$_3$) bond as observed by the proton nuclear magnetic resonance method is not more than 50%. That is, in a proton nuclear magnetic resonance ($^1$H-NMR) spectral analysis of the above contact product in toluene solvent at room temperature, the methyl proton signal due to Al—CH$_3$ is observed in the region of 1.0 to −0.5 ppm (tetramethylsilane (TMS) standard). Since the proton signal of TMS (0 ppm) is in the region of the methyl proton signal due to Al—CH$_3$, the methyl proton signal due to Al—CH$_3$ is measured with 2.35 ppm methyl proton signal of TMS standard. The methyl proton signal is divided into two components: the high magnetic field component in the −0.1 to −0.5 ppm region and the other magnetic field component in the 1.0 to −0.1 ppm region. In alkylaluminoxane preferably used as component (b), the area of the high magnetic field component is not more than 50%, preferably 45 to 5% of the total signal area.

The reaction of the alkylaluminum compound and water is not critical and can be carried out according to the well known methods. For example, (1) a method in which alkylaluminum compound is dissolved in an organic solvent and then contacted with water, (2) a method in which alkylaluminum compound is first added at the time of polymerization and then water is added, and (3) a method in which alkylaluminum compound is reacted with the water of crystallization contained metal salts and the like, or water absorbed in inorganic or organic materials are mentioned.

In the present invention, the catalyst composed of component (a) and (b) may be used, and if desired, in addition to the above catalyst, other catalytic components can be added. As other catalytic components, organic aluminum compound can be mentioned and specifically those represented by the general formula:

$$AlR^6_3 \qquad (VI)$$

wherein, $R^6$ is a hydrogen atom or an alkyl group having 1 to 10 carbon atoms. In the formula, an alkyl group having 1 to 10 carbon atoms represented by $R^6$ includes a methyl group, an ethyl group, a propyl group, an isopropyl group, a butyl group, an isobutyl group, t-butyl group, a pentyl group, a hexyl group, a pentyl group, an octyl group and the like. $R^6$ may be identical or different.

As such organic aluminum compounds, specifically triisobutylaluminum, and diisobutylaluminum monohydride are suitable.

In the present invention, the ratio of amount of component (a) and (b) varies depending on the kind thereof, the kind of styrene monomer, reaction condition, molecular weight or molecular weight distribution of the desired styrene polymer, and can not be decided definitely, but usually a ratio of titanium contained in component (a) and aluminum contained in component (b), i.e. aluminum/titanium (molar ratio), is 1 to $10^6$, preferably 10 to $10^5$. However, when other organic aluminum compound is used as described above, it is preferably added that the total amount of aluminum contained in it and aluminum of component (b) should be in the above range.

The molar ratio of one titanium compound contained in component (a) and the other titanium compound contained in component (a) is 1:99 to 99:1, preferably 10:90 to 90:10.

In the present invention, the mixing method of catalysts is not critical, for example, the method in which not less than two kinds of titanium compounds of component (a) are previously mixed and then contacted with component (b), and if desired, with organic aluminum compound, and the method in which component (b), and if desired, organic aluminum compound is contacted with each of not less than two kinds of titanium compounds of component (a) and then mixed, can be applied. The mixing of the catalytic components is usually carried out at the temperature of 0° to 100° C.

In the present invention, polymerization or copolymerization of the beforementioned styrene monomer may be carried out in the presence of the above catalyst. As polymerization method, conventional method, for example, bulk polymerization, solution polymerization using solvents such as an Asiatic hydrocarbon such as pentacle, hexane and hexane; an alicyclic hydrocarbon such as cyclohexane, or an aromatic hydrocarbon such as benzene, toluene and xylene, or slurry polymerization and the like can be applied. Any methods may be applied, but bulk polymerization is especially excellent in productivity. In addition, batch polymerization and continuous polymerization may be applied.

In the above polymerization, reaction temperature is not particularly limited, but is usually 0° to 100° C., preferably 20° to 80° C. In batch polymerization, reaction time is 10 minutes to 20 hours, preferably 0.5 to 5 hours.

The amount of catalyst used to the styrene monomer as material is not particularly limited, but preferably 0.001 to 1 mole per one liter of the styrene monomer. A ratio of alkylaluminoxane and the transition metal compound, in terms of the ratio of aluminum and titanium, i.e. aluminum/titanium (molar ratio), is 1 to $10^6$, and preferably 10 to $10^4$.

After polymerization, if necessary, the resulting polymer is subject to post-treatment, a styrene polymer having a high purity can be obtained in high yield.

Styrene polymers thus obtained are those having syndiotactic configuration, especially high syndiotacticity. The styrene-based polymer having a syndiotactic configuration means that the polymer has a stereostructure with a configuration that is syndiotactic, i.e., the stereostructure in which phenyl groups or substituted phenyl groups as side chains are located alternately at opposite directions relative to the main chain consisting of carbon-carbon bonds. The tacticity is quantitatively determined by the nuclear magnetic resonance method using carbon isotope ($^{13}C$-NMR method). The tacticity as determined by the $^{13}C$-NMR method can be indicated in terms of proportions of structural units continuously connected to each other, i.e., a diad in which two structural units are connected to each other, a triad in which three structural units are connected to each other, or pentad in which five structural units are connected to each other. Styrene-based polymers having syndiotactic configuration of the present invention include such a syndiotacticity that the proportion of racemic diad is at least 75% and preferably at least 85%, or the proportion of racemic pentad is at least 30% and preferably at least 50%.

Further, styrene polymers obtained in the present invention have a wide molecular weight distribution, that is, weight average molecular weight (Mw)/number average molecular weight (Mn) such as in the range of 3 to 100, preferably 4 to 50, and are styrene polymers having a syndiotactic configuration with a wide molecular weight distribution as compared with conventional styrene polymers.

The number average molecular weight of styrene polymer produced by the process of the present invention is not critical and usually 1,000 to 5,000,000 preferably 5,000 to 4,000,000.

As described above, according to the process of the present invention, styrene polymers having syndiotactic configuration of especially high tacticity with a wide molecular weight distribution can be produced by a simple process. Such styrene polymers are excellent in physical properties such as heat resistance because of high syndiotacticity, have a wide molecular weight distribution and can be used suitably for hollow molding, sheet and film molding.

Accordingly, styrene polymers obtained in the process of the present invention are effectively used as materials of various moldings including hollow molding, sheet molding, film molding and the like as well as injection molding.

The present invention will be described in greater detail by referring to the following Examples and Comparative Examples.

EXAMPLE 1

Into a 500 ml glass container with a stirrer, 200 ml of styrene was placed, heated to 70° C., and then 4 mmol of methylaluminoxane was added as aluminum atom, and then a mixed solution of 0.005 mmol of cyclopentadienyltitanium trimethoxide and 0.005 mmol of pentamethylcyclopentadienyltitanium trimethoxide was added, and polymerization was carried out at 70° C. for 30 minutes. Then, the reaction was stopped with methanol, and the mixture was deashed with hydrochloric acid-methanol and was washed with methanol, dried to obtain 6.15 g of polymer. The weight average molecular weight (Mw) of the polymer was 870,000, Mw/Mn was 24.60.

EXAMPLES 2 TO 5 AND COMPARATIVE EXAMPLE 1

The same procedure was repeated as in Example 1 except that catalytic component and reaction condition in Example 1 were changed to as shown in Table 1.

EXAMPLE 7

Into a 500 ml glass container with a stirrer, 100 ml of toluene was placed, and heated to 50° C., then 7.5 mmol of methylaluminoxane was added as aluminum atom, and then 0.0125 mm of a mixed solution (1:1) of cyclopentadienyltitanium trichloride and tetraethoxytitanium was added, and polymerization was carried out at 50° C. for 1 hour. Then, the reaction was stopped with methanol, and the mixture was deashed with hydrochloric acid-methanol, washed with methanol, and dried to obtain 0.42 g of polymer. The weight average molecular weight (Mw) was 96,500, Mw/Mn was 5.14.

TABLE 1

| No. | Catalytic Component (mmol)*[1] | | | | Polymerization Condition | | Polymer Formed | | |
|---|---|---|---|---|---|---|---|---|---|
| | CpTi(OR)$_3$ | Cp *Ti(OCH$_3$)$_3$ | MAO | TIBA | Temperature (°C.) | Time (min.) | Yield (g) | Mw | Mw/Mn |
| Example 1 | 0.005 (R:CH$_3$) | 0.005 | 4 | — | 70 | 30 | 6.15 | 870,000 | 24.60 |
| Example 2 | 0.0075 (R:CH$_3$) | 0.0025 | 4 | — | 70 | 30 | 2.28 | 363,000 | 21.83 |
| Example 3 | 0.01 (R:CH$_3$) | 0.01 | 4 | — | 70 | 30 | 11.26 | 595,000 | 12.07 |
| Example 4 | 0.01 (R:i-C$_3$H$_7$) | 0.01 | 4 | — | 70 | 30 | 19.00 | 952,000 | 12.12 |
| Example 5 | 0.01 (R:CH$_3$) | 0.01 | 2 | 2 | 70 | 30 | 7.07 | 453,000 | 18.85 |
| Comparative Example 1 | — | 0.01 | 4 | — | 70 | 30 | 15.28 | 1,069,000 | 2.41 |

*[1] shown in millimoles of titanium or aluminum contained.
CpTi(OR)$_3$ Cyclopentadienyltitanium trialkoxide
Cp *Ti(OCH$_3$)$_3$ Pentamethylcyclopentadienyltitanium trimethoxide
MAO Methylaluminoxane
TIBA Triisobutylaluminum

EXAMPLE 6

Into a 500 ml glass container with a stirrer, 200 ml of styrene was placed, and heated to 70° C., then a mixed solution of 2 mmol of methylaluminoxane as aluminum atom and 0.01 mmol of cyclopentadienyltitanium trimethoxide and a mixed solution of 2 mmol of methylaluminoxane as aluminum atom and 0.01 mmol of pentamethylcyclopentadienyltitanium trimethoxide were added, and polymerization was carried out at 70° C. for 2 hours. Then, the reaction was stopped with methanol, the mixture was deashed with hydrochloric acid-methanol and was washed with methanol, dried to obtain 11.06 g of polymer. The weight average molecular weight (Mw) was 957,000, Mw/Mn was 5.62.

EXAMPLES I to VII

The same procedure as in Example 1 has been carried out except for changing titanium catalyst components to those as shown in Table A. The results are shown in Table A.

EXAMPLE VIII

The same procedure as in Example 1 has been carried out except for changing titanium catalyst components to those as shown in Table A end changing the reaction temperature to 60° C. The results are shown in Table A.

EXAMPLE IX to XI

The same procedure as in Example 7 has been carried out except for changing titanium catalyst components to those as shown in Table B. The results are shown in Table B.

TABLE A

| Example No. | Titanium Compounds | | | | Polymer Formed | | |
|---|---|---|---|---|---|---|---|
| | | | | | Yield (g) | Mw | Mn/Mw |
| I | CpTi(OMe)$_3$ | 0.005 mmol | Et$_1$Me$_4$CpTi(OMe)$_3$ | 0.005 mmol | 7.10 | 920,000 | 27.30 |
| II | MeCpTi(OMe)$_3$ | 0.005 mmol | Cp*Ti(OMe)$_3$ | 0.005 mmol | 6.23 | 750,000 | 21.62 |
| III | Me$_3$CpTi(OMe)$_3$ | 0.005 mmol | Cp*Ti(OMe)$_3$ | 0.005 mmol | 6.62 | 705,000 | 23.05 |
| IV | Me$_4$CpTi(OMe)$_3$ | 0.005 mmol | Cp*Ti(OMe)$_3$ | 0.005 mmol | 7.05 | 790,000 | 18.30 |
| V | tBuCpTi(OMe)$_3$ | 0.005 mmol | Cp*Ti(OMe)$_3$ | 0.005 mmol | 4.52 | 893,000 | 11.72 |
| VI | CpTiCl$_3$ | 0.005 mmol | Cp*Ti(OMe)$_3$ | 0.005 mmol | 5.34 | 807,000 | 30.61 |
| VII | CpTi(OMe)$_3$ | 0.005 mmol | Cp*TiMe$_3$ | 0.005 mmol | 6.56 | 863,000 | 20.35 |
| VIII | CpTi(OMe)$_3$ | 0.0075 mmol | Cp*Ti(OMe)$_3$ | 0.005 mmol | 6.50 | 1,010,000 | 38.50 |

CpTi(OMe)$_3$ Cyclopentadienyl titanium trimethoxide
MeCpTi(OMe)$_3$ Methylcyclopentadienyl titanium trimethoxide
Me$_3$CpTi(OMe)$_3$ 1,3,4-trimethylcyclopentadienyl titanium trimethoxide
Me$_4$CpTi(OMe)$_3$ 1,2,3,4-tetramethylcyclopentadienyl titanium trimethoxide
Et$_1$Me$_4$CpTi(OMe)$_3$ 1-ethyl-2,3,4,5-tetramethylcyclopentadienyl titanium trimethoxide
tBuCpTi(OMe)$_3$ t-butylcyclopentadienyltitanium trimethoxide
CpTiCl$_3$ Cyclopentadienyl titanium trichloride
Cp*TiMe$_3$ Pentamethylcyclopentadienyl trimethyltitanium
Cp*Ti(OMe)$_3$ Pentamethylcyclopentadienyl trimethoxytitanium

TABLE B

| Example No. | Titanium Compounds | | Polymer Formed | | |
|---|---|---|---|---|---|
| | | | Yield (g) | Mw | Mw/Mn |
| IX | CpTi(OEt)₃-Ti(OEt)₄ | (1:1) | 1.67 | 165,000 | 8.12 |
| X | CpTiCl₃-TiBz₄ | (1:1) | 0.50 | 82,500 | 4.56 |
| XI | MeCpTiCl₃-Ti(OEt)₄ | (1:1) | 0.46 | 113,000 | 5.74 |

CpTi(OEt)₃ Cyclopentadienyl titanium triethoxide
Ti(OEt)₄ Titanium tetraethoxide
TiBz₄ Tetrabenzyltitanium
MeCpTiCl₃ Methylcyclopentadienyl titanium trichloride

What is claimed is:

1. A process for producing styrene polymer having a syndiotactic configuration, which process comprises polymerizing styrene monomers in the presence of catalysts comprising:
   (a) a combination of TiRXYZ and TiR'X'Y'Z' in a molar ratio of from 10:90 to 90:10, wherein R is a cyclopentadienyl group, a substituted cyclopentadienyl group having 1 to 4 substituents or an indenyl group; R' is a substituted cyclopentadienyl group having 5 substituents; X, Y, Z, X', Y', and Z' are independently an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms, or a halogen and said substituents are individually selected from alkyl groups having from 1 to 6 carbon atoms, and
   (b) alkylaluminoxane.

2. The process according to claim 1, wherein the ratio of weight average molecular weight/number average molecular weight of the styrene polymer is in the range of 4 to 50.

3. The process according to claim 2, wherein, of not less than two kinds of titanium compounds, at least one titanium compound is one having one unsaturated π electron type ligand.

4. The process according to claim 2, wherein the titanium compound, suitable for producing lower molecular weight styrene polymers is a titanium compound represented by the formula:

$$\text{TiRXYZ} \qquad (\text{III})$$

wherein, R represents a cyclopentadienyl group, a substituted cyclopentadienyl group having 1 to 4 substituents or an indenyl group, X, Y and Z independently represent an alkyl group having 1 to 12 carbon atoms, an alkoxyl group having 1 to 12 carbon atoms, an aryl group having 6 to 20 carbon atoms, an aryloxy group having 6 to 20 carbon atoms, an arylalkyl group having 6 to 20 carbon atoms or a halogen.

5. The process according to claim 2, wherein (a) not less than two kinds of titanium compounds are combinations of pentamethylcyclopentadienyltitanium trimethoxide and cyclopentadienyltitaniumtrimethoxide; pentamethylcyclopentadienyltitanium trimethoxide and cyclopentadienyltitanium triisopropoxide; pentamethylcyclopentadienyltitanium triisopropoxide and cyclopentadienyltitaniumtrimethoxide; pentamethylcyclopentadienyltitanium triphenoxide and cyclopentadienyltitanium triphenoxide; pentamethylcyclopentadienyltitanium trimethoxide and 1,3-dimethylcyclopentadienyltitanium trimethoxide; pentamethylcyclopentadienyititanium trimethoxide and 1,3,4-trimethylcyclopentadienyltitanium trimethoxide; pentamethylcyclopentadienyltitanium trichloride and cyclopentadienyltitanium trichloride; or pentamethylcyclopentadienyltrimethyltitanium and cyclopentadienyltrimethyltitanium.

6. The process according to claim 1, wherein TiRXYZ is cyclopentadienyl titanium trimethoxide; methylcyclopentadienyl titanium trimethoxide; 1,3,4-trimethylcyclopentadienyl titanium trimethoxide; 1,2,3,4-tetramethylcyclopentadienyl titanium trimethoxide or t-butylcyclopentadienyltitanium trimethoxide.

7. The process according to claim 6, wherein TiR'X'Y'Z' is 1-ethyl-2,3,4,5-tetramethylcyclopentadienyl titanium trimethoxide, pentamethylcyclopentadienyl trimethyltitanium or pentamethylcyclopentadienyl trimethoxytitanium.

8. The process according to claim 1, wherein the aluminoxane is methylaluminoxane.

9. The process according to claim 1, wherein TiRXYZ is cyclopentadienyltitanium trichloride and wherein TiR'X'Y'Z' is pentamethylcyclopentadienyltitanium trichloride.

10. The process according to claim 9, wherein said alkylaluminoxane is methyl aluminoxane.

* * * * *